United States Patent
Brown et al.

(10) Patent No.: US 7,548,954 B2
(45) Date of Patent: Jun. 16, 2009

(54) COMPRESSIBLE DISPLAY OF E-MAIL MESSAGE STRING TO FACILITATE READABILITY

(75) Inventors: Michael K. Brown, Kitchener (CA); Michael G. Kirkup, Waterloo (CA); Michael S. Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 916 days.

(21) Appl. No.: 11/011,370

(22) Filed: Dec. 15, 2004

(65) Prior Publication Data
US 2006/0167976 A1    Jul. 27, 2006

(51) Int. Cl.
G06F 15/16 (2006.01)
H04M 11/00 (2006.01)
(52) U.S. Cl. ..................................... 709/206
(58) Field of Classification Search ........................ None
See application file for complete search history.

(56) References Cited

U.S. PATENT DOCUMENTS

| | | | |
|---|---|---|---|
| 2002/0073157 A1* | 6/2002 | Newman et al. | 709/206 |
| 2003/0005065 A1* | 1/2003 | Lin et al. | 709/206 |
| 2003/0154256 A1* | 8/2003 | Hadano et al. | 709/206 |
| 2004/0044735 A1 | 3/2004 | Hoblit | |
| 2004/0225901 A1 | 11/2004 | Bear et al. | |
| 2005/0057584 A1* | 3/2005 | Gruen et al. | 345/752 |

FOREIGN PATENT DOCUMENTS

EP    1220520 A2    7/2002

OTHER PUBLICATIONS

Next Button For Jumping/Tabbing Between Internet Hypertext Transfer Protocol Hyperlinks:, IBM Technical Disclosure Bulletin, IBM Corp., New York, US, vol. 41, No. 1, 1998, p. 435, XP000772162.

* cited by examiner

*Primary Examiner*—Hassan Phillips
(74) *Attorney, Agent, or Firm*—Perry + Currier Inc.

(57) ABSTRACT

A displayed string of emails is effectively compressed for improved readability by deleting some or all headers and/or by skipping the cursor from one message body to another in response to "hot" key actuation(s) by a user.

8 Claims, 8 Drawing Sheets

```
----------------------------------------
Lets meet at Timmy's

----- Original Message -----
From: Bob
Sent: Bill
Subject: RE: Where to meet for lunch Ok, where should we meet?

----- Original Message -----
From: Bill
Sent: October 8, 2004 12:30 PM
To: Bob
Subject: Where to meet for lunch Want to go for lunch?
----------------------------------------
```

*Fig. 6a*

```
----------------------------------------
→ Lets meet at Timmy's

[----- Original Message -----
    From: Bob
    Sent: Bill
    Subject: RE: Where to meet for lunch]

Ok, where should we meet?

----- Original Message -----
From: Bill
Sent: October 8, 2004 12:30 PM
To: Bob
Subject: Where to meet for lunch Want to go for lunch?
----------------------------------------
```

→ Lets meet at Timmy's

Ok, where should we meet?

----- Original Message -----
From: Bill
Sent: October 8, 2004 12:30 PM
To: Bob
Subject: Where to meet for lunch Want to go for lunch?

*Fig. 6d*

Lets meet at Timmy's

→ Ok, where should we meet?

~~----- Original Message -----
From: Bill
Sent: October 8, 2004 12:30 PM
To: Bob
Subject: Where to meet for lunch~~

Want to go for lunch?

*Fig. 6e*

---
Lets meet at Timmy's

⟶ Ok, where should we meet?

Want to go for lunch?

---
Lets meet at Timmy's

Ok, where should we meet?

⟶ Want to go for lunch?

( NO MORE MSG PARTS )

---

COMPRESSIBLE DISPLAY OF E-MAIL MESSAGE STRING TO FACILITATE READABILITY

BACKGROUND OF THE INVENTION

1. Technical Field

This invention deals generally with method and apparatus for improving the readability of email message strings.

2. Related Art

Many times the originator of a message will initiate an email "conversation" which causes many subsequent replies and re-replies and/or, forwardings (perhaps to and from multiple recipients/senders). The result can be a long string of individual email messages. Unfortunately, the message headers associated with each individual reply or forwarding or the like are also included in a typical display of a raw string of related email messages.

This can make later (or even current) comprehension of the entire email exchange difficult. This is especially so when the email message string is displayed on a relatively small screen (e.g., on a handheld wireless communication device or the like which may only be able to display a relatively limited number of text lines simultaneously on the screen). Of course, as most will appreciate, this same sort of problem can occur even on larger screens such as are available on typical personal computers and the like.

While such email message strings may of course be edited by highlighting and deleting portions and thus eliminating redundant material or the like, such traditional editing efforts are time consuming and may become complex (depending upon the size of the string and/or the nature of the editing software). In addition, such traditional editing of the string may accidentally result in loss of the desired message body portion of some message (i.e., of material that is actually not redundant).

BRIEF SUMMARY

We have recognized that it would be very useful to provide a convenient way for a reader to automatically but controllably skip less meaningful portions of the email message string.

For example, if each successive reply and/or forward includes both a message header text and message body text, it may be convenient to permit deletion of some or all of the message header text so as to effectively compress the display of email exchanges into a simultaneous (or more nearly simultaneous) display of all meaningful text on the available display area. Of course, even if less important text is not actually deleted, even moving automatically from one message body to the next in response to a single key actuation or the like would also provide a benefit and improve readability. This also effectively "compresses" the complete email string such that meaningful message body parts can be successively accessed for viewing by successive actuations of a "hot" key on the keyboard or the like. A context sensitive menu item might also be employed to permit a selective user command of some pre-defined type to be detected and acted upon in this manner.

In short, trying to read a message that is made up of multiple forwards and/or replies can be very difficult on a device with a small screen. This is because in between each message "part" there is a message header which can be multiple screen fulls in size (especially on smaller screens). It would be nice to have a method to skip from one message string "part" to the next.

This can be accomplished through either a hot key or a context sensitive menu item or some other convenient way for a user to provide a predetermined "skip" command to an associated display unit processor. For example, a message with multiple forwards/replies in it might look like:

Lets meet at Timmy's
----Original Message----
From: Bob
Sent: Oct. 8, 2004 1:00 PM
To: Bill
Subject: RE: Where to meet for lunch
Ok, where should we meet?
----Original Message----
From: Bill
Sent: Oct. 8, 2004 12:30 PM
To: Box
Subject: Where to meet for lunch
Want to go for lunch?

On some smaller handheld displays, the message header can fill up much of the screen. Even worse, message headers that contain many recipients can fill up multiple screens.

Upon invoking, e.g., a hot key/menu item, one may skip down to the first line after the "Subject" line. If no such line exists, the display may stay where it is and a dialog box may pop up to tell the user that there are no more message parts.

So in the above example, if the cursor was on the "Let's meet at Timmy's line, then a skip could take the cursor and display to the "Ok, where should we meet?" line.

This is especially beneficial when one is reading something included in the middle of an email thread because one could then quickly read through the previous parts of the thread and catch up with what is going on. Of course there also could be a hot key to go back upwards through the message parts, rather than just scanning in one direction.

This invention may be embodied in hardware, software or a combination of hardware and software. The invention also provides a method for providing a compressible display of email message strings to facilitate readability—especially in a small handheld wireless communication device. The exemplary embodiment is realized, at least in part, by executable computer program code (i.e., logic) which may be embodied in physical program memory media.

BRIEF DESCRIPTION OF THE DRAWINGS

These and other objects and advantages of this invention will be better understood and appreciated in conjunction with the following detailed description of exemplary embodiments taken together with the accompanying drawings, of which:

FIGS. 6A-6F illustrate successive modification of an email message string having message headers and message bodies as it is successively processed to evermore simpler formats for compressed display.

DETAILED DESCRIPTION OF EXEMPLARY EMBODIMENTS

Figure 1:
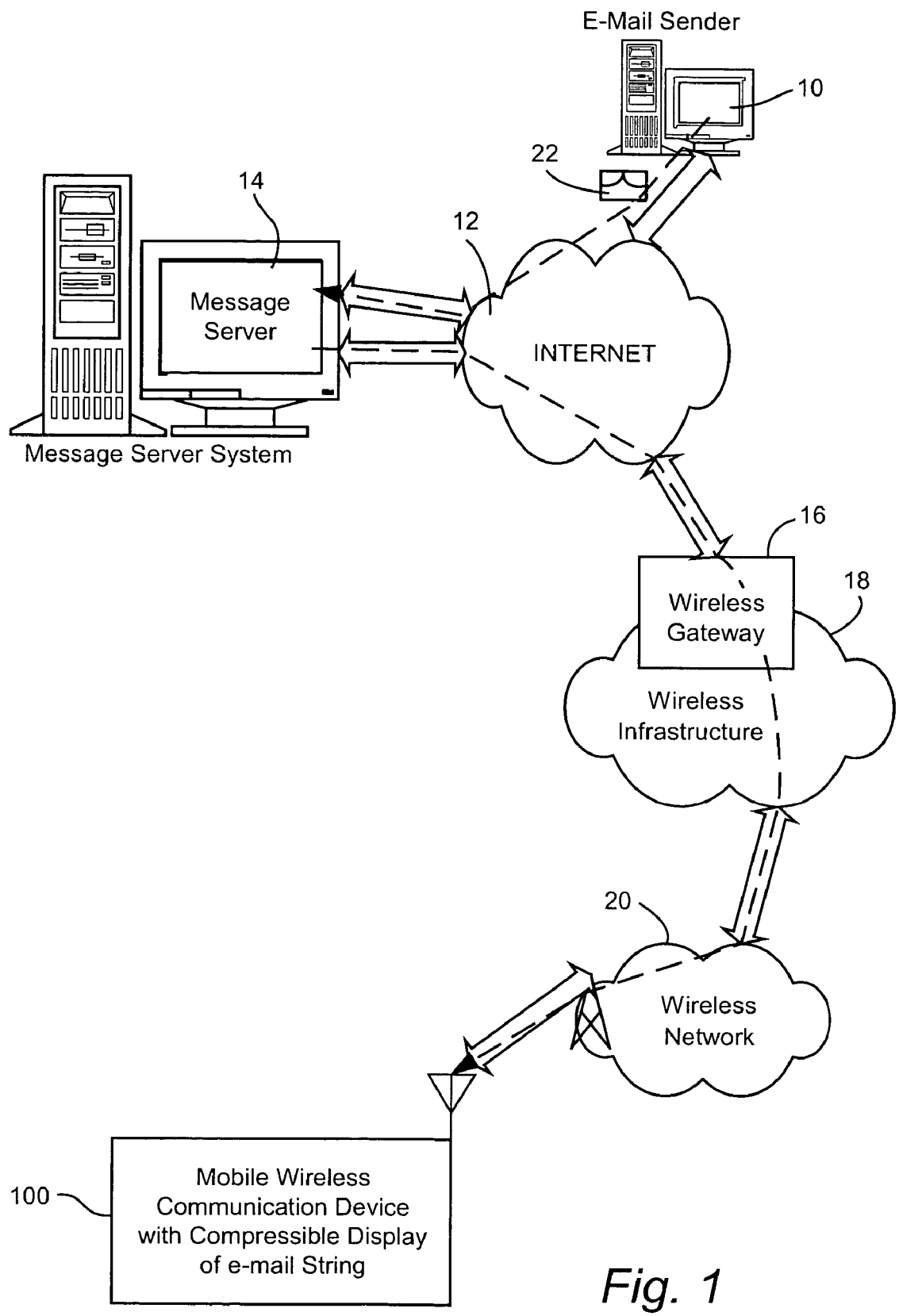
FIG. 1 is an overall system wide schematic view of an exemplary wireless email communication system incorporating a mobile wireless communication device with a selectively compressible display of email string feature.

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet email environment.

FIG. 1 shows an email sender 10, the Internet 12, a message server system 14, a wireless gateway 16, wireless infrastructure 18, a wireless network 20 and a mobile communication device 100.

An email sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although email transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for email exchange over the Internet 12. Although other messaging systems might not require a message server system 14, a mobile device 100 configured for receiving and possibly sending email will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just email sending and receiving; they also include dynamic database storage engines that have predefined database formats for data like calendars, to-do lists, task lists, email and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed email message 22 is sent by the mail sender 10, located somewhere on the Internet 12. This message 22 typically uses traditional Simple Mail Transfer Protocol (SMTP), RFC 822 headers and Multipurpose Internet Mail extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific email address associated with the mobile device 100. In a preferred embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
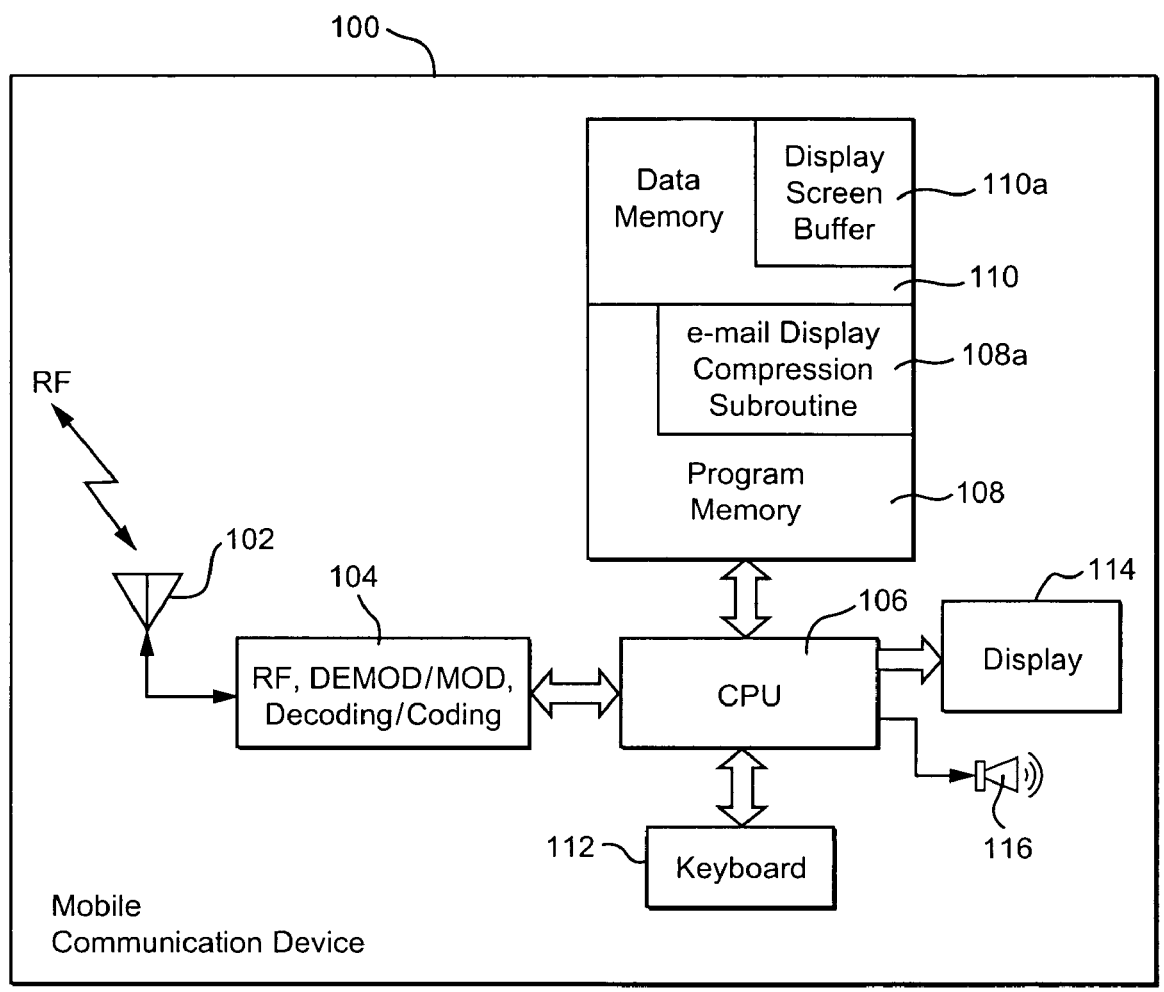
FIG. 2 is an abbreviated schematic diagram of hardware included within an exemplary mobile wireless communication device of FIG. 1.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 100). CPU 106 also communicates with a conventional keyboard 112, display 114 (e.g., an LCD) and audio transducer or speaker 116. A portion of program memory 108a available for storing one or more program sub-routines (i.e., program executable code or logic) for controllably compressing the display of an email message string. As will also be appreciated, a display screen buffer 110a will typically store a file (e.g., an email message string) which is at least partially displayed at 114.

In most email display apparatus (e.g., like mobile communication device 100), a file of text including a complete email message string will reside in data memory and some or all of it will appear in a display screen buffer (including at least the portion of the entire file that is currently being displayed on the screen). This text file is "open" and available for text editing. The exemplary embodiment of this invention provides automated text editing of a particular type. However, those in the art will recognize that other kinds of automated text editing may also be used for effectively "compressing" the email message string so as to improve its readability (i.e., by either skipping around automatically in the email chain, thread or string and/or by automatically deleting all or portions of less important pieces of the string (e.g., headers)).

As is well known, many if not most computer driven devices with keyboards have "hot" keys (or key combinations) which, when actuated by the user, cause an immediate predetermined response associated with the hot key functionality that has been defined in logic for that particular key in given modes of operation. That is, conventional keyboard monitoring software/hardware routinely watches for the next key stroke (and/or simultaneous actuation of predetermined combinations of keys) and takes appropriate action depending upon which key (keys) has (have) been actuated. When an email display apparatus is put into the automatic "compression" editing mode in accordance with the exemplary embodiment, then there is at least one user action (e.g., the activation of a particular "hot" key) which will thereafter invoke certain automatic text editing and/or display skipping logic such as that depicted in FIGS. 3-5.

Figure 3:
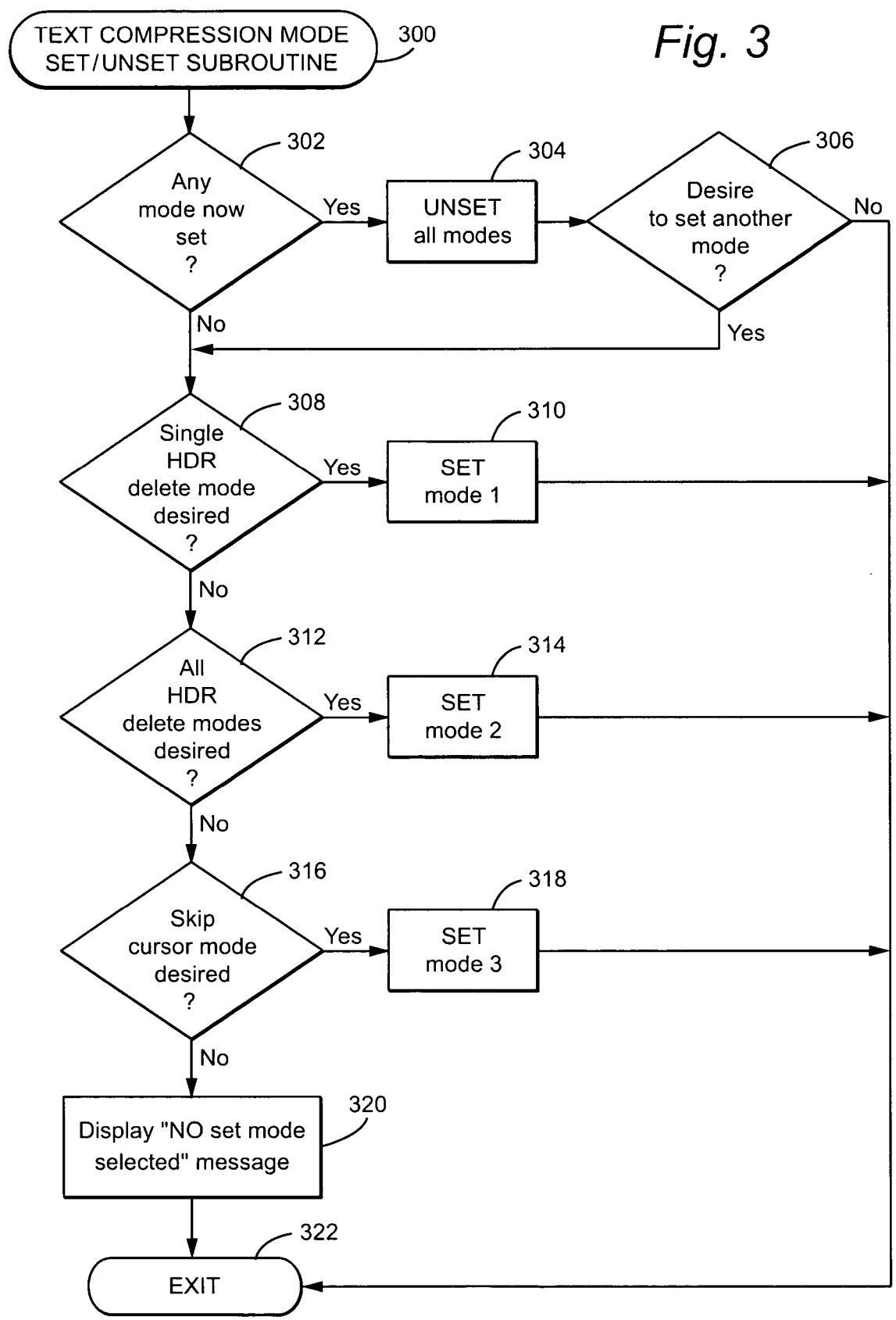
FIGS. 3-5 are exemplary abbreviated schematic flow charts of computer software (i.e., program logic) that may be utilized in the device of FIG. 2 so as to provide a feature permitting compressible display of email message strings to facilitate readability.

If a text compression mode of operation is desired, then a mode set/unset sub-routine can be entered at 300 as shown in FIG. 3. If any text compression mode is already set as tested at 302, then all modes are reset at 304 and an inquiry is made at 306 to detect a possible desire to set another mode. At 308, 310 the user, is given an option to set a single header delete mode. At 312, 314 the user is given an option to set an all header delete mode. At 316, 318 the user is given an option to set a skip cursor mode. If no options are taken, a no set mode selected message is displayed at 320 before the sub-routine is exited at 322.

Figure 4:
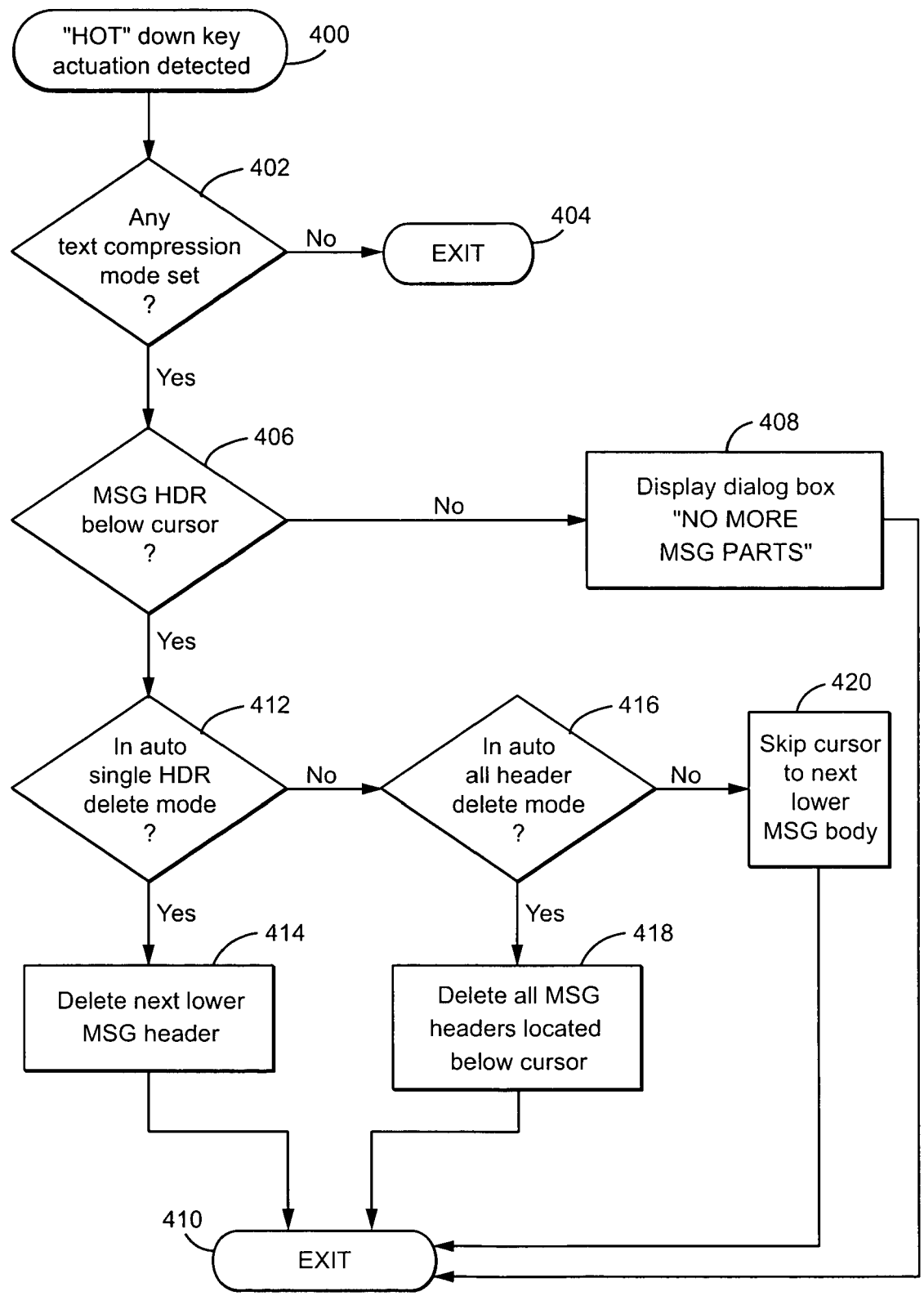

As depicted in FIG. 4, if a hot key "down" is actuated (e.g., "D" or "S" or the like as determined by appropriate hot key definition software), a logic of FIG. 4 is entered at 400. A test is made at 402 to find out if any text compression mode is set. If not, then an immediate exit is taken at 404. If a text compression mode is set, then a test is made at 406 to find out if there is any email message located below the current cursor position. If not, then a suitable dialog box indicating "no more message parts" may be displayed at 408 and the routine exited at 410 as indicated in FIG. 4. On the other hand, if there is still a message located below the current location of the cursor, then at 412 at test is made for single header mode and, if set, then the next lower message header may be deleted at 414 from the display automatically. Similarly, if the all header delete mode is detected at 416, then all lower message headers are deleted at 418. If the skip cursor mode is set, then the cursor is automatically skipped downward at 420 to the next lower message body.

Figure 5:
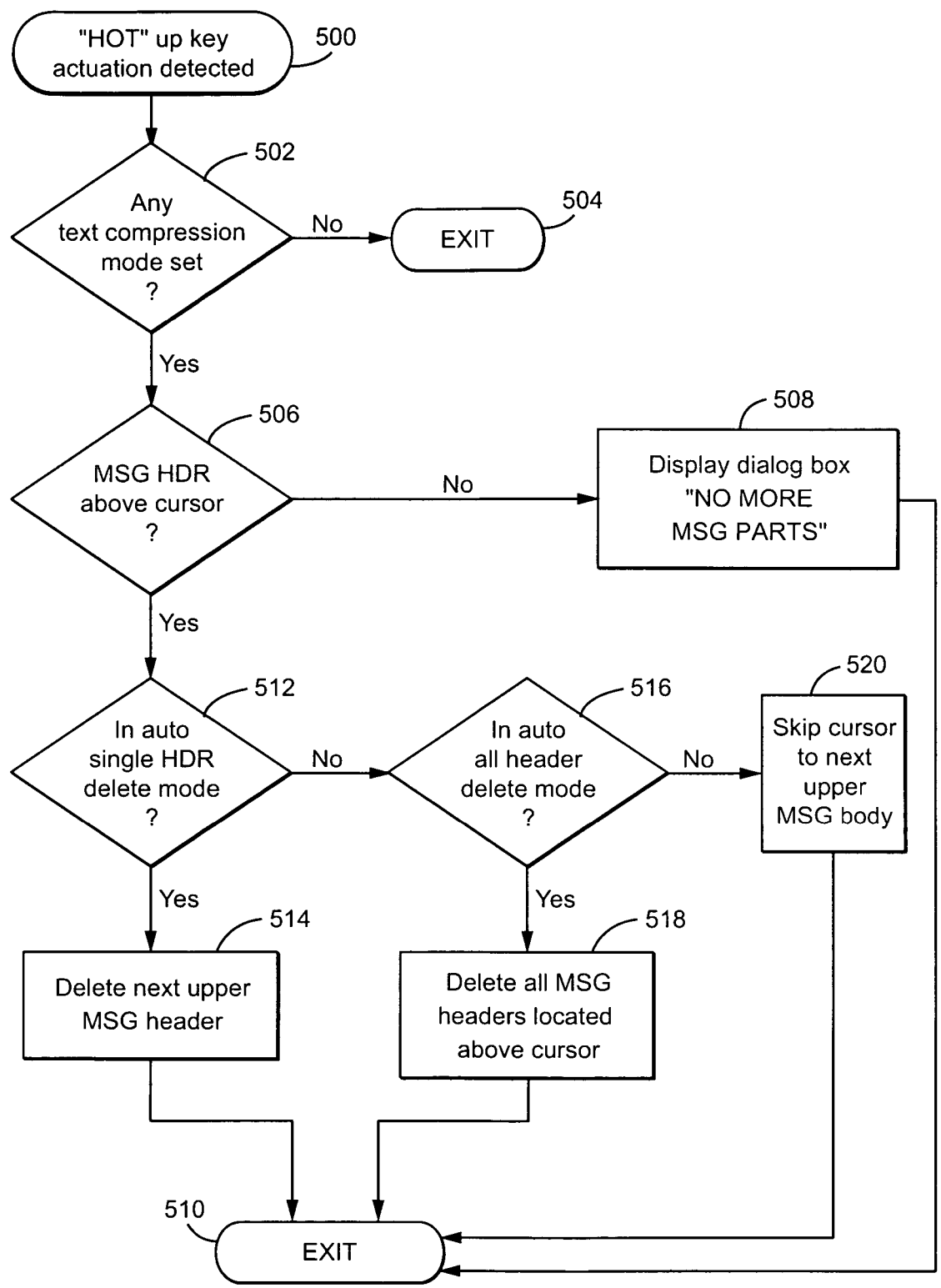

Similarly, the logic of FIG. 5 is entered at 500 (e.g., when a different "hot" key "up" is activated such as, for example, the "W" or "U" key). The flowchart elements in FIGS. 4 and 5 having the same lower order digits are analogous except for direction of actions. For example, now moving in the upward direction rather than the downward direction, a test is made at 506 to see if there is any message displayed above the current cursor location. If not, then at 508 a suitable dialog box message is displayed indicating that there are no more message parts to be processed thereabove. On the other hand, if there is still at least a message above the cursor, then at 512 the next upper message header may be automatically deleted at 514 or, depending upon the user selected mode of operation, the cursor may simply be skipped at 520 ahead to the next higher message body in the string.

As those in the art will appreciate, the hot key definition may require two or more physical keys to be simultaneously actuated or sequentially actuated and/or may require the user to enter a particular menu selected mode of operation before becoming active.

Assuming that the user has selected the mode for successive automatic deletion of single message header portions, a sequential actuation of the hot "down" key may cause a sequence of operations as illustrated in FIGS. 6A-6F. For example, shown in FIG. 6A, a complete email message string includes a lowermost original message with header as well as message body and a second reply original message located there just above also having a header as well as message body and a third reply message body at the very top.

If the user positions the cursor as depicted by the arrow at the top of the string in FIG. 6B and actuates the hot "down" key, then the message header portion just there below (indicated with a crossed box) is automatically deleted so as to result in a compressed email string as depicted at FIG. 6C. Using the exemplary embodiment of FIG. 4, even without moving the cursor, another actuation of the "hot" down key would cause deletion of the next successive message header portion in the downward direction as depicted in FIG. 6D so as to result in the further compressed email string depicted at FIG. 6E.

Once again, in the exemplary embodiment of FIG. 4, even if the cursor is not moved by the user, another depression of the "hot" down key would result in finding no more message headers therebelow so the dialog box displaying "no more message parts" would be displayed instead as shown in FIG. 6F.

Of course, if the tests being made at 406 and 506 are looking only for any immediately adjacent portion of a message (i.e., either header or body), then the user would have to move the cursor into successive positions as shown in FIGS. 6A-6F in order to obtain the same end result. However, in the exemplary embodiments of FIGS. 3-5, the test at 406 and 506 is actually looking for any message headers (below or above the cursor, respectively) and therefore the cursor could be left fixed at some particular starting point as may be desired by the user.

As will be appreciated, the desired display also may be automatically performed in its entirety in a selected mode of operation so as to initially display the final fully compressed display (e.g., FIG. 6F).

Those skilled in the art will recognize that many variations and modifications may be made to the exemplary embodiments described above while yet retaining novel features and advantages of those exemplary embodiments. Accordingly, all such variations and modifications are intended to be included within the scope of the appended claims.

What is claimed is:

1. A method for improving readability of an email message string displayed on a handheld mobile wireless communication device having a correspondingly limited display area, the string including successive message headers with their respective associated message bodies and exceeding an available capacity for simultaneous display of successive text lines, said method comprising:

automatically determining parts of such message string having possibly greater interest to a reader;

displaying at least a portion of a complete email message string including successive message headers with their respective associated message bodies on the handheld mobile wireless communication device;

displaying one such determined part of the email message string so as to enhance its readability;

the step of displaying the one such determined part comprising automatically deleting from such display one message header upon a pre-defined user command being detected;

upon each repetition of said pre-defined user command being detected, automatically deleting from such display at least one further message header if such is still present, said successive deletions beginning at a user-marked location in the display, wherein successive repetition of said pre-defined user command causes increasing lines of remaining message body text to be simultaneously displayed to the user.

2. A method as in claim 1 wherein said pre-defined user command is effected by actuation of at least one hot key on a keyboard associated with a device on which said display appears.

3. A method as in claim 1 wherein said successive deletions occur in a downward direction through the message string.

4. A method as in claim 1 wherein said successive deletions occur in an upward direction through the message string.

5. A handheld mobile wireless communication device having a correspondingly limited display area, the device comprising an email display apparatus capable of compressing display of an email message string to improve readability of the email message string that exceeds an available capacity for simultaneous display of successive text lines, by automatically determining parts of such message string having possibly greater interest to a reader, said device comprising:

a visual display capable of displaying at least a portion of a complete email message string including successive message headers with their respectively associated message bodies, and displaying one such determined part of the e-mail message string so as to enhance its readability on the handheld mobile wireless communication device;

an email display processor including a user command detector and processor which, upon detecting such command, automatically deletes from such display one message header, said processor being adapted, upon detecting a repetition of said user command, to automatically delete one further message header from said display if such is still present, and said processor being adapted to cause successive deletions to begin at a user-marked location in the display, and said processor being adapted to cause a successive repetition of said user command to cause increasing lines of remaining message body text to be simultaneously displayed to the user.

6. An email display apparatus as in claim 5 wherein said user command detector includes at least one hot key on a keyboard associated with the email display apparatus.

7. A handheld mobile wireless communication device as in claim 5 wherein said processor is adapted to cause successive deletions to occur in a downward direction through the message string.

8. A handheld mobile wireless communication device as in claim 5 wherein said processor is adapted to cause successive deletions to occur in an upward direction through the message string.

* * * * *